United States Patent [19]

Rouser

[11] Patent Number: 5,204,160
[45] Date of Patent: Apr. 20, 1993

[54] LIGHT-COLLIMATING FILM

[75] Inventor: Forrest J. Rouser, San Rafael, Calif.

[73] Assignee: Minnesota Mining and Manufacturing Company, Saint Paul, Minn.

[21] Appl. No.: 707,413

[22] Filed: May 28, 1991

Related U.S. Application Data

[63] Continuation of Ser. No. 539,376, Jun. 18, 1990, abandoned, which is a continuation of Ser. No. 229,827, Aug. 8, 1988, abandoned.

[51] Int. Cl.$^5$ .................................................. B32B 3/28
[52] U.S. Cl. .................................... 428/167; 428/68; 428/120; 428/141; 428/142; 428/156; 428/161; 428/163; 428/168; 428/172; 428/173; 428/201; 428/203; 428/204; 428/206; 428/207; 428/409; 428/212; 428/908.8; 428/913; 351/47; 351/165; 351/166; 359/321; 359/614; 359/641; 359/738
[58] Field of Search ............... 428/144, 65, 212, 522, 428/34, 412, 167, 168, 173, 161, 166, 156, 38, 68, 120, 141, 142, 143, 156, 163, 409, 201, 206, 172, 204, 203, 207, , 908.8, 913; 52/473; 350/102, 103, 104, 345; 362/390, 325, 317, 342, 347; 351/47, 165, 166; 359/321, 513, 614, 641, 738

[56] References Cited

U.S. PATENT DOCUMENTS

| | | | |
|---|---|---|---|
| Re. 27,617. | 4/1973 | Olsen | 428/114 |
| 1,578,982 | 3/1926 | Gloster | 428/173 |
| 1,878,023 | 9/1932 | Streuber | 428/167 |
| 2,034,308 | 3/1936 | Morgan | 428/173 |
| 2,587,594 | 3/1952 | Chavannes et al. | 428/167 |
| 2,882,413 | 4/1959 | Vingerhuets | 250/80 |
| 3,044,202 | 7/1962 | Lindmark | 428/161 |
| 3,653,138 | 4/1972 | Cooper | 40/130 R |
| 3,707,416 | 12/1972 | Stevens | 156/196 |
| 3,791,722 | 2/1974 | Ahlberg et al. | 351/45 |
| 3,919,559 | 11/1975 | Stevens | 428/464 |
| 3,922,440 | 11/1975 | Wegwerth | 428/437 |
| 4,025,673 | 5/1977 | Reinnagel | 428/29 |
| 4,127,693 | 11/1978 | Lemelson | 428/163 |
| 4,553,818 | 11/1985 | Cohen | 350/276 R |
| 4,621,898 | 11/1986 | Cohen | 350/276 R |
| 4,621,898 | 11/1986 | Cohen | 350/276 R |

Primary Examiner—Donald J. Loney
Attorney, Agent, or Firm—Gary L. Griswold; Walter N. Kirn; Stephen W. Buckingham

[57] ABSTRACT

A plastic film has a series of grooves the interiors of which are rendered light absorbing to form a light-collimating film.

16 Claims, 2 Drawing Sheets

LIGHT-COLLIMATING FILM

This is a continuation of application Ser. No. 07/539,376 filed Jun. 18, 1990 now abandoned, which was a continuation of application Ser. No. 07/229,827 filed Aug. 8, 1988, now abandoned.

This invention relates to light-collimating plastic films.

BACKGROUND OF THE INVENTION

Light-collimating plastic films, sometimes known as light control film, are well-known in the art. Such films typically have opaque plastic louvers lying between strips of clear plastic. U.S. Pat. No. Re 27,617 (Olsen) teaches a process of making such a louvered light control film by skiving a billet of alternating layers of plastic having relatively low and relatively high optical densities. After skiving, the high optical density layers provide light-collimating louver elements which, as illustrated in the patent, may extend orthogonally to the surface of the resulting louvered plastic film. U.S. Pat. No. 3,707,416 (Stevens) discloses a process whereby the light-collimating louver elements may be canted respect to the surface of the light control film. U.S. Pat. No. 3,919,559 (Stevens) teaches a process for attaining a gradual change in the angle of cant of successive light-collimating louver elements.

Such light-collimating films have many uses. U.S. Pat. No. 3,791,722 (Ahlberg et al.) teaches the use of such films in lenses for goggles to be worn where high levels of illumination or glare are encountered. Such films also may be used to cover a back-lighted instrument panel, such as the dashboard of a car, to prevent undesired reflections in locations such as the windshield. A louvered plastic film may also be used to give a black and white photographic negative the appearance of a positive made from the negative, as taught in U.S. Pat. No. 3,653,138 (Cooper). U.S. Pat. No. 3,922,440 (Wegwerth et al.) teaches that because louvered plastic films "are thin sheet materials: (1) they are not by themselves capable of structurally withstanding extreme stresses and (2) they are subject to distortion from physical stress and temperatures" (Col. 1, lines 19-22). This physical weakness is particularly pronounced because the films are composite products made from alternating layers of different materials. Furthermore, the skiving by which the louvered plastic films are produced results in irregular surfaces. Such irregular surfaces prevent the skived plastic films from transmitting a clear optic image. Accordingly, the Wegwerth et al. patent teaches the lamination of clear plastic films on each side of the skived louvered film. These clear plastic films provide protection and support as well as an optically-smooth surface.

The process of laminating louvered plastic films between two clear films requires an expensive press that is also expensive to operate. The expense results, in part, from the need to distribute heat uniformly and, in part, from the need to apply pressure with precision. Because the resulting laminates cannot be larger than the platens of the press in which they are laminated, the press must be sufficiently large to produce the largest required size, thus increasing the expense of the press.

SUMMARY OF THE INVENTION

The invention provides an inexpensive polymer film that has properties similar to or better than the louvered plastic films of the prior art. According to the invention a plastic film with a series of grooves is prepared. Preferably those grooves are narrow with relatively steep sides and flat bottoms. The grooves are then either filled with a light-absorbing material or painted on the sides and bottom with a light-absorbing ink. The resulting film will then function as a light control film similar to the prior skived louvered plastic films.

DETAILED DESCRIPTION OF THE PREFERRED EMBODIMENT

Figure 1:
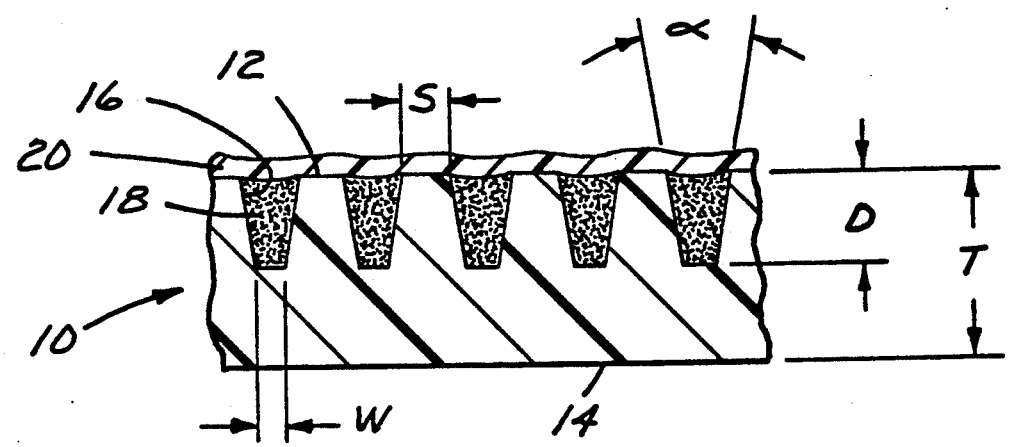
FIG. 1 is a cross-sectional view of a film according to one embodiment of the present invention.

FIG. 1 shows a film 10 manufactured according to the present invention. Film 10 has surfaces 12 and 14. Surface 12 has grooves such as groove 16 while surface 14 is planar. The grooves on surface 12 are typically either linear and parallel or arcuate and concentric, although other configurations are possible for specific applications. Normally surface 14 would be a planar, optically-smooth surface, although for some applications a light control film having a matte finish is desired. For those applications surface 14 could be provided with a matte finish. Alternatively surface 14 could, for a particular application, be a structured surface.

In order to increase the strength of the film a cover sheet 20, typically of a transparent polymer material, may be bonded to surface 12 of film 10. Cover sheet 20 may be attached to surface 12 by any of a number of known techniques such as thermal bonding or the use of an adhesive. Alternatively cover sheet 20 may be formed by coating surface 20 with a monomer or oligomer composition and polymerizing it in place. Preferably a radiation-curing process is used to polymerize the layer.

The grooves in surface 12 are separated by a distance designated S. They have a depth designated D. The side walls of the grooves form an included angle designated $\alpha$. The total thickness of the film is designated T.

The grooves may be filled with a light-absorbing material or, alternatively, may have their walls coated with a light-absorbing ink. The phrase "light absorbing" will be used herein to refer to materials that absorb electromagnetic radiation in or near the visible spectrum. Thus the expression "light-absorbing materials" will be understood to include materials that absorb in the infrared or ultraviolet regions. The light-absorbing material may be opaque over a wide range of frequencies or may absorb light only in a narrow frequency band. Films using absorbers of the latter type would be useful, for example, in eyewear designed to protect the wearer's eyes from infrared radiation.

In many situations the image quality transmitted through the film is considered important. In such applications the light-absorbing material used in the grooves should have an index of refraction matching that of the transparent film. This reduces total internal reflection at the groove walls and thus improves image quality.

In order for film 10 to function effectively as a light control film, the separation S must be small enough in comparison to the depth D of the groove to permit light collimation. At the same time S should remain great enough to permit an adequate amount of light to pass through the film.

Related to the above requirement is a requirement that the included angle $\alpha$ between the walls of the grooves should be as small as possible. Smaller included angles permit a greater percentage of the light impinging the screen to pass through. Preferably, $\alpha$ should be no greater than 5°, although films with larger included angles will function effectively although with a reduced on-axis transmission.

In one preferred embodiment a light control film has grooves with an included angle $\alpha$ equal to 3.5°. The grooves have a depth, D, of 0.015 inches and a flat bottom with a width, W, of 0.0004 inches. The grooves further are separated by a distance S, of 0.0055 inches. Theoretical calculations indicated that a film manufactured according to these specifications would have performance equal to or greater than the prior art skived film in terms of light collimating efficiency and on-axis light transmission.

Figure 2:
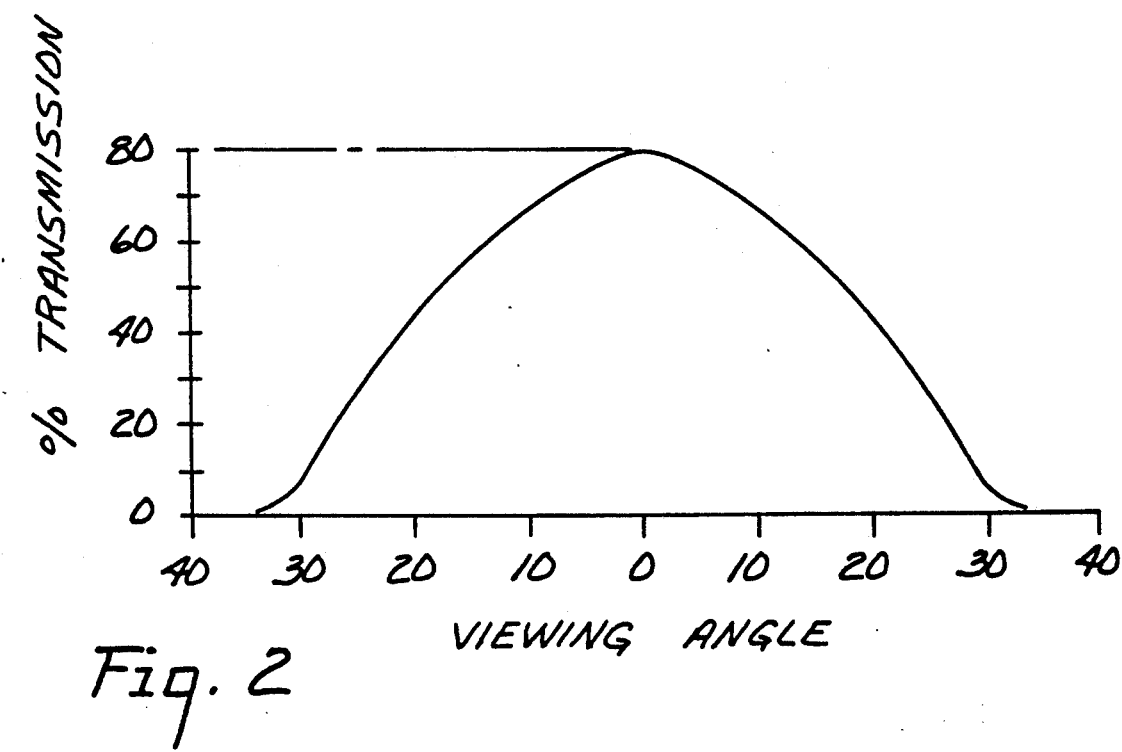
FIG. 2 is a graph showing typical light transmission as a function of viewing angle for a film according to the embodiment of FIG. 1.

FIG. 2 shows the percentage of incident light transmitted through the film as a function of the angle of incidence to the film for a typical film of the invention. As may be seen from FIG. 2 the percentage transmission falls off in a linear manner, reaching essentially zero transmission when the light is incident at an angle of approximately 35° with respect to the film axis.

Figure 3:
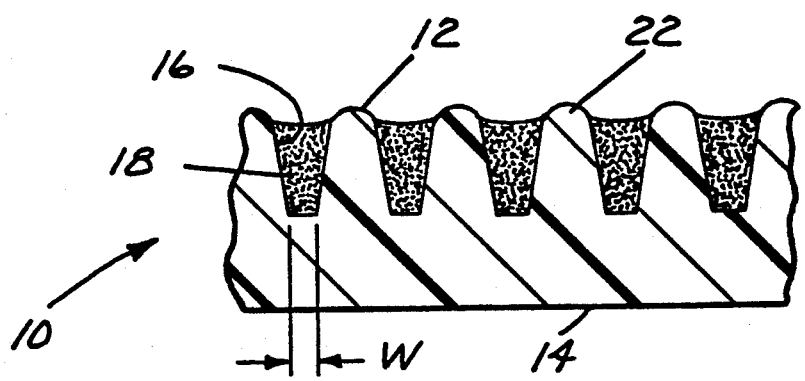
FIG. 3 is a cross-sectional view of a film according to a second embodiment of the present invention.
Figure 4:
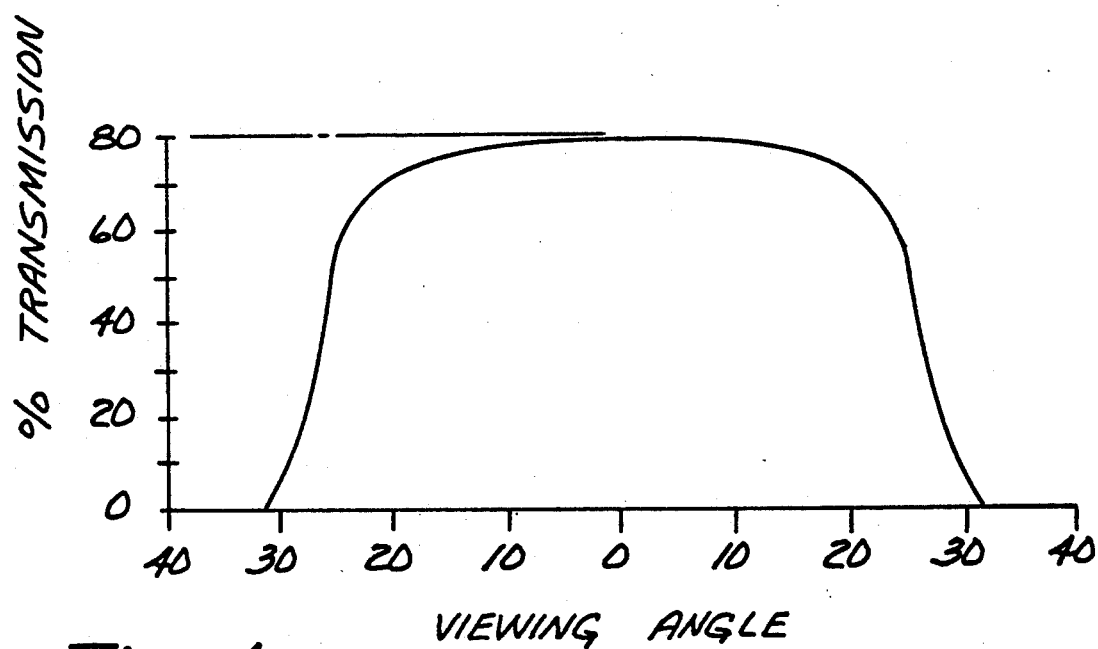
FIG. 4 is a graph showing typical light transmission as a function of viewing angle for a film according to the embodiment of FIG. 3.

FIG. 3 shows an alternative embodiment of the invention that alters the angular dependence of light transmission. In the embodiment of FIG. 3 surface 12 has lenses such as lens 22 separating the grooves. If the grooves are linear the lenses separating them would be linear or cylindrical lenses. FIG. 4 shows the light transmission characteristics of a typical film according to the embodiment of FIG. 3. As may be seen the percentage of light transmission remains largely constant for a wide range of angles of incidence and then falls rapidly to zero. The embodiment of FIG. 3 may advantageously be used in applications where viewing from a variety of angles is desirable. For example the embodiment of FIG. 3 is useful in providing security for video display screens. The operator is provided a clear view of the screen from a wider range of angles than would the film of FIG. 1 while the film still prevents others reading the displayed data.

EXAMPLE

In order to prepare a light-collimating film according to the invention, a flat brass blank 3 feet wide and 4 feet long had linear grooves machined to a depth of 16 mils with an included angle of 17°. The tips of the groove peaks were flat and were 3.5 mils wide. The valley at the bottom of the grooves were also flat and were 1.7 mils wide. From this a nickel electroform was created. With the electroformed tool, polymethylmethacrylate parts were compression molded into sheets. The resulting parts had grooves with a separation S of 0.0035 inches, a groove bottom width W of 0.0017 inches, a groove depth D of 0.016 inches and a film thickness T of 0.030 inches. The included angle $\alpha$ between the walls of the grooves were 17°.

Following the compression molding of these films the interior of the grooves was coated with a black opaque lacquer ink. Great care was taken not to deposit any of the ink on the groove peaks.

Theoretical calculations indicated that these films should transmit 32 percent of the light that struck them on the film axis. These theoretical calculations further indicated that transmission of light would be 0 percent at a 35° off-axis angle. Experimental results confirmed these calculations.

What is claimed is:

1. A light control film comprising a transparent plastic film having first and second major surfaces, said first major surface having a plurality of grooves, the interiors of said grooves being rendered light absorbing, said film further comprising cylindrical lenses between adjacent grooves.

2. The light control film of claim 1 wherein the interiors of said grooves are rendered light absorbing by filling said interiors with a light-absorbing material.

3. The light control film of claim 1 wherein the interiors of said grooves are rendered light absorbing by treating said interiors with a light-absorbing ink.

4. The light control film of claim 1 wherein each of said grooves has two side walls and a flat bottom, said side walls forming an included angle with one another.

5. The light control film of claim 4 wherein said included angle is no greater than 5°.

6. The light control film of claim 5 wherein the interiors of said grooves are rendered light absorbing by filling said interiors with a light-absorbing material.

7. The light control film of claim 5 wherein the interiors of said grooves are rendered light absorbing by treating said interiors with a light-absorbing ink.

8. The light control film of claim 5 wherein said included angle is no greater than 3.5°.

9. The light control film of claim 1 wherein said second surface is planar and optically smooth.

10. The light control films of claim 9 wherein each of said grooves has two side walls and a flat bottom, said side walls forming an included angle with one another.

11. The light control film of claim 10 wherein said included angle is no greater than 5°.

12. The light control film of claim 11 wherein the interiors of said grooves are rendered light absorbing by filling said interiors with a light-absorbing material.

13. The light control film of claim 11 wherein the interiors of said grooves are rendered light absorbing by treating said interiors with a light-absorbing ink.

14. The light control film of claim 1 wherein said second surface is planar and has a matte finish.

15. The light control film of claim 1 further comprising a cover sheet adhered to said first surface.

16. The light control film of claim 1 wherein said grooves are linear and parallel.

* * * * *